(12) United States Patent
Quix et al.

(10) Patent No.: US 11,015,505 B2
(45) Date of Patent: May 25, 2021

(54) METHODS AND SYSTEMS FOR COOLING AN AFTERTREATMENT DEVICE

(71) Applicant: Ford Global Technologies, LLC, Dearborn, MI (US)

(72) Inventors: Hans Guenter Quix, Herzogenrath (DE); Andreas Kuske, Geulle (NL); David van Bebber, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/773,739

(22) Filed: Jan. 27, 2020

(65) Prior Publication Data

US 2020/0240304 A1    Jul. 30, 2020

(51) Int. Cl.
*F01N 3/20* (2006.01)
*F02D 9/04* (2006.01)
(Continued)

(52) U.S. Cl.
CPC ............. *F01N 3/208* (2013.01); *F01N 3/021* (2013.01); *F01N 3/2006* (2013.01); *F01N 5/025* (2013.01);
(Continued)

(58) Field of Classification Search
CPC ........ F01N 3/208; F01N 3/021; F01N 3/2006; F01N 3/02; F01N 3/055; F01N 3/2046; F01N 5/025; F01N 13/009; F01N 2900/1602; F01N 2610/02; F02D 9/04; F02D 9/08; F02D 41/0055; F02D 41/0065; F02D 41/0077; F02M 26/06; F02M 26/15; F02M 26/16; F02M 26/42; F02M 26/21; F02M 26/26; F02M 26/33; F02M 35/10222
(Continued)

(56) References Cited

U.S. PATENT DOCUMENTS 8,511,077 B2    8/2013  Schwarzkopf
9,255,513 B2    2/2016  Surnilla et al.
(Continued)

FOREIGN PATENT DOCUMENTS

DE    102011017482 A1    4/2012
EP      2982842 A1       2/2016
(Continued)

OTHER PUBLICATIONS

Jääskel äinen, H. et al., "EGR Systems & Components," DieselNet Website, Available Online at https://dieselnet.com/tech/engine_egr_sys.php, Available as Early as Nov. 12, 2012, 7 pages.
(Continued)

*Primary Examiner* — Audrey K Bradley
*Assistant Examiner* — Dapinder Singh
(74) *Attorney, Agent, or Firm* — Geoffrey Brumbaugh; McCoy Russell LLP

(57) ABSTRACT

Methods and systems are provided for cooling an aftertreatment device with exhaust gas. In one example, an exhaust system comprises a recirculation passage branching from an EGR passage from downstream of an EGR cooler to a portion of an exhaust passage between the EGR passage and an aftertreatment device. In one example, the aftertreatment device is an SCR device.

20 Claims, 12 Drawing Sheets

(51) Int. Cl.
*F02M 26/21* (2016.01)
*F02M 35/10* (2006.01)
*F01N 3/021* (2006.01)
*F01N 5/02* (2006.01)
*F02M 26/26* (2016.01)

(52) U.S. Cl.
CPC ............... *F02D 9/04* (2013.01); *F02M 26/21* (2016.02); *F02M 26/26* (2016.02); *F02M 35/10222* (2013.01); *F01N 2900/1602* (2013.01)

(58) Field of Classification Search
USPC ............... 60/273, 280, 287, 288, 602, 605.2
See application file for complete search history.

(56) References Cited

U.S. PATENT DOCUMENTS

| 9,624,875 | B2 | 4/2017 | Pifer et al. | |
| 10,711,672 | B2* | 7/2020 | Ulrey | F02M 26/15 |
| 2008/0098733 | A1* | 5/2008 | Dickerson | F02D 23/00 |
| | | | | 60/602 |
| 2009/0013978 | A1* | 1/2009 | Joergl | F02B 29/0418 |
| | | | | 123/568.12 |
| 2016/0146083 | A1 | 5/2016 | Lang et al. | |
| 2017/0276096 | A1* | 9/2017 | Fischer | F02M 26/44 |
| 2017/0335805 | A1* | 11/2017 | Zhang | F01N 3/20 |
| 2018/0202396 | A1* | 7/2018 | Zhang | F02M 26/47 |
| 2018/0245533 | A1* | 8/2018 | Vijlbrief | F02D 31/006 |

FOREIGN PATENT DOCUMENTS

| EP | 3103978 A1 | 12/2016 |
| JP | 2014101836 A | 6/2014 |
| WO | 2012108796 A1 | 8/2012 |
| WO | 2018127401 A1 | 7/2018 |

OTHER PUBLICATIONS

"Powerfin: Extruded Finned Tubes", Thermofin Website, Available Online at https://thermofin.net/products/powerfin-extruded-finned-tubes/, Available as Early as Jul. 31, 2017, 8 pages.

German Patent and Trademark Office, Examination Report Issued in Application No. 10201920134.2, dated Jul. 26, 2019, 5 pages. (Submitted with Partial Translation).

* cited by examiner

METHODS AND SYSTEMS FOR COOLING AN AFTERTREATMENT DEVICE

CROSS REFERENCE TO RELATED APPLICATION

The present application claims priority to German patent application No. 102019201034.2, filed on Jan. 28, 2019. The entire contents of the above-listed application are hereby incorporated by reference for all purposes.

FIELD

The present description relates generally to an exhaust gas system for an internal combustion engine, and a motor vehicle.

BACKGROUND/SUMMARY

The emission of nitrogen oxides is one of the main challenges with modern internal combustion engines, in particular diesel engines. To reduce the nitrogen oxide emissions, therefore, exhaust gas aftertreatment devices are provided in the exhaust gas tract of an internal combustion engine in order to aftertreat the exhaust gas produced by the internal combustion engine. As well as lean nitrogen oxide traps, also known as LNT catalysts, SCR systems (selective catalytic reduction) are a technology for converting nitrogen oxide into other substances. SCR systems may be arranged in cars or trucks at a distance from the internal combustion engine as underfloor SCR systems, i.e. in an underfloor region of the motor vehicle.

In order to achieve adequate nitrogen oxide aftertreatment, the SCR system may be operated in a specific temperature range, since otherwise the conversion rate of the nitrogen oxides is too low, and if the temperature is too high there is also a risk of thermal damage to the SCR system. Too high a temperature may occur for example if the internal combustion engine is operated under high load To cool an SCR system, WO 2018/127,401A1 discloses a method in which, when cooling is demanded, compressed intake air of the internal combustion engine is introduced into the exhaust gas tract downstream of the SCR system via a low-pressure exhaust gas recirculation line. The disadvantage here is that cooling of the SCR system and exhaust gas recirculation are not possible simultaneously, and also, by diverting part of the compressed intake air, the performance of the internal combustion engine may be adversely affected.

EP 3,103,978A1 describes an arrangement for tempering an SCR system in which the exhaust gas flows through a heat transmitter upstream of the SCR system and can thereby be cooled. The disadvantage here however is the need for additional installation space for arranging the heat transmitter and the associated tempering circuit.

The inventors have recognized the above described problems and have come up with a way to at least partially solve them. In one example, an exhaust gas system of an internal combustion engine comprises an exhaust gas tract designed to receive an exhaust gas produced by an internal combustion engine, an SCR system arranged in the exhaust gas tract, a choke device arranged in the exhaust gas tract upstream of the SCR system; a low-pressure exhaust gas recirculation tract, referred to below as an LP-EGR tract, which connects a recirculation extraction point arranged in the exhaust gas tract upstream of the choke device with a recirculation introduction point arranged in an intake air tract; an EGR valve (exhaust gas recirculation valve) arranged at the recirculation introduction point; a cooler arranged in the LP-EGR tract; a bypass line which connects a bypass extraction point arranged in the LP-EGR tract upstream of the cooler with a bypass introduction point arranged in the LP-EGR tract downstream of the cooler; a bypass valve arranged at the bypass extraction point; a recirculation line which connects a recirculation extraction point arranged in the bypass line with a recirculation introduction point arranged in the exhaust gas tract downstream of the choke device and upstream of the SCR system; and a recirculation valve arranged in the recirculation line.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 11A and 11B are shown approximately to scale, however, other relative dimensions may be used if desired.

DETAILED DESCRIPTION

Figure 1:
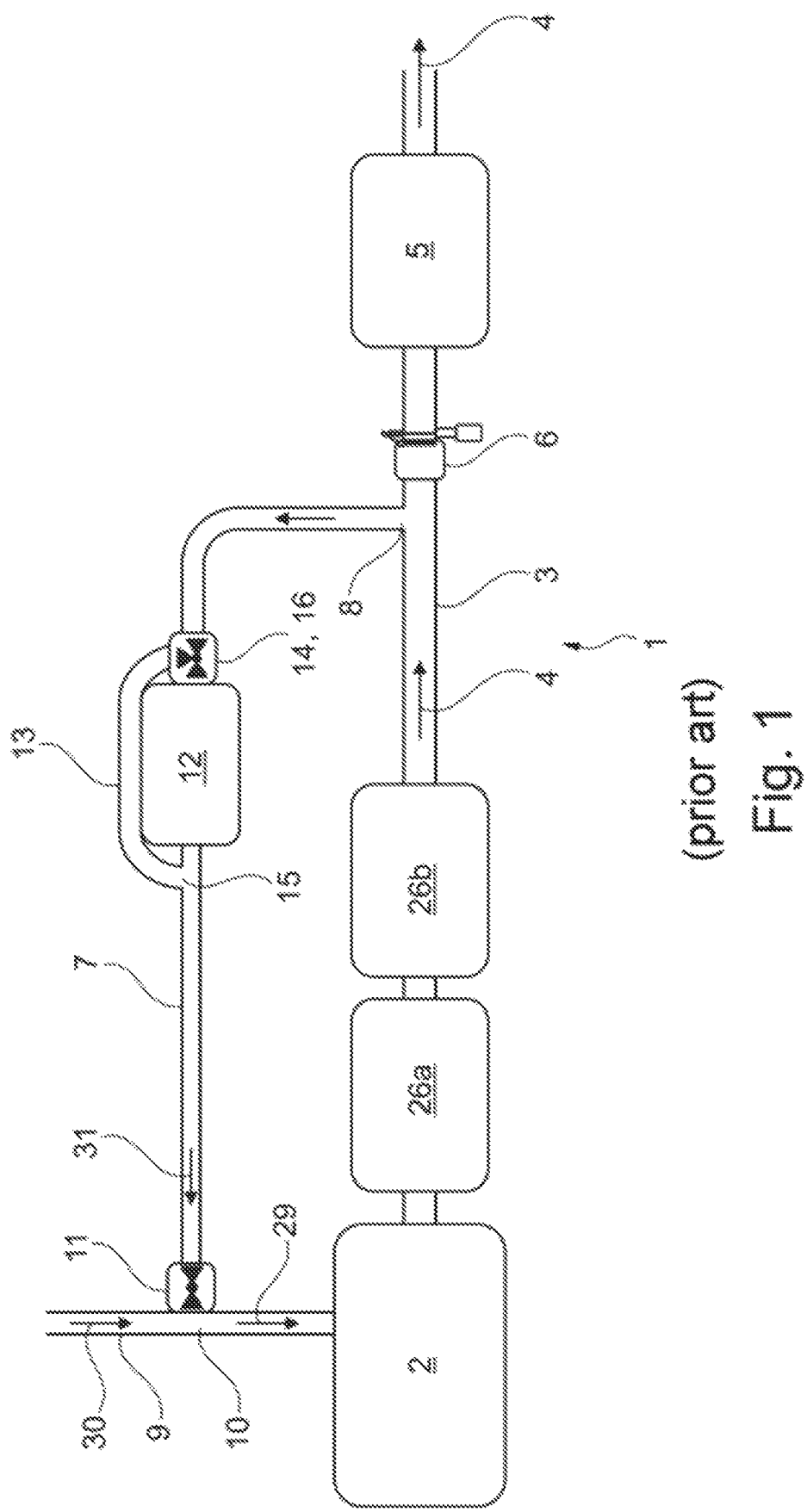
FIG. 1 shows an internal combustion engine with an exhaust gas system according to the prior art.
Figure 2:
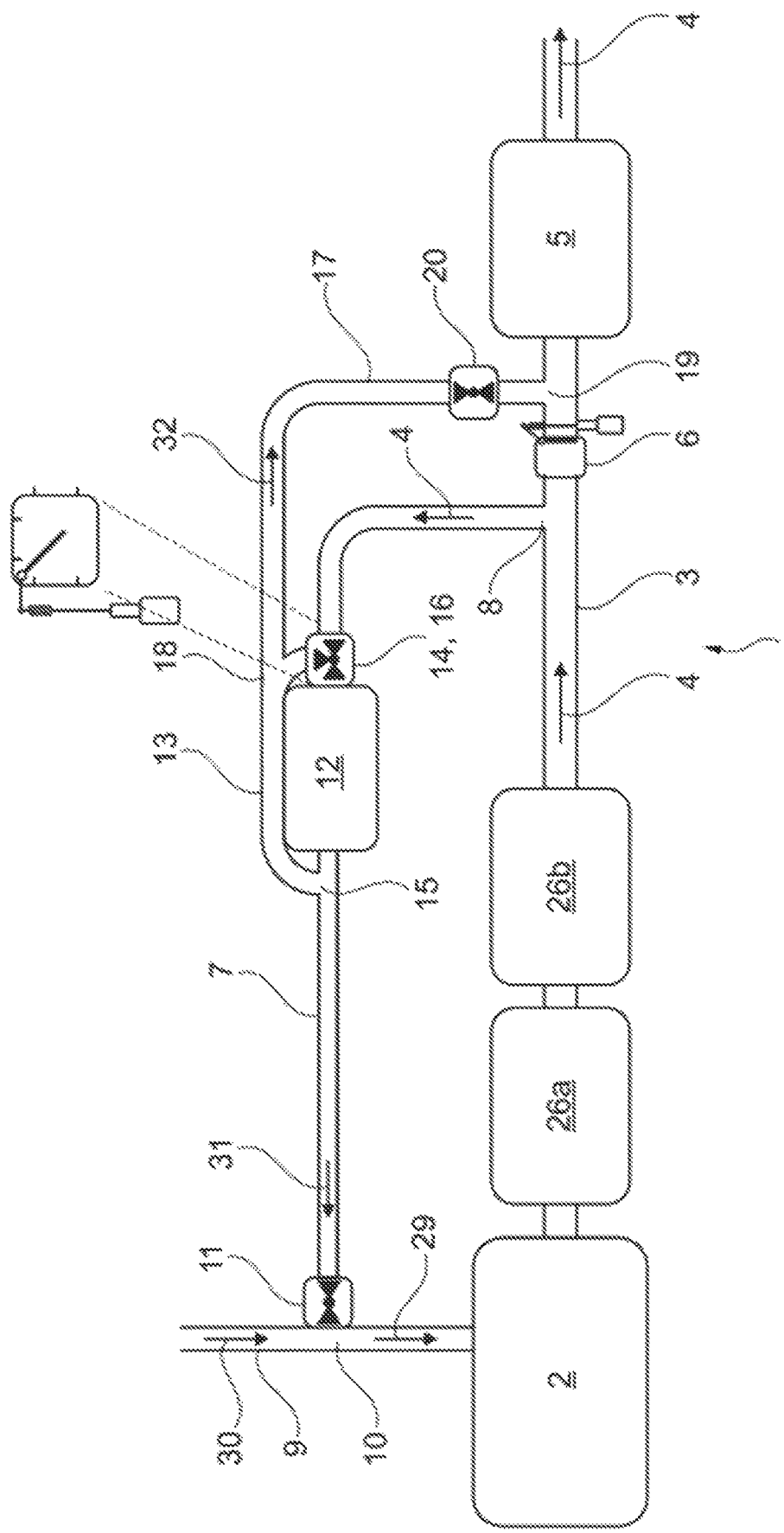
FIG. 2 shows an internal combustion engine with an exemplary exhaust gas system.
Figure 3:
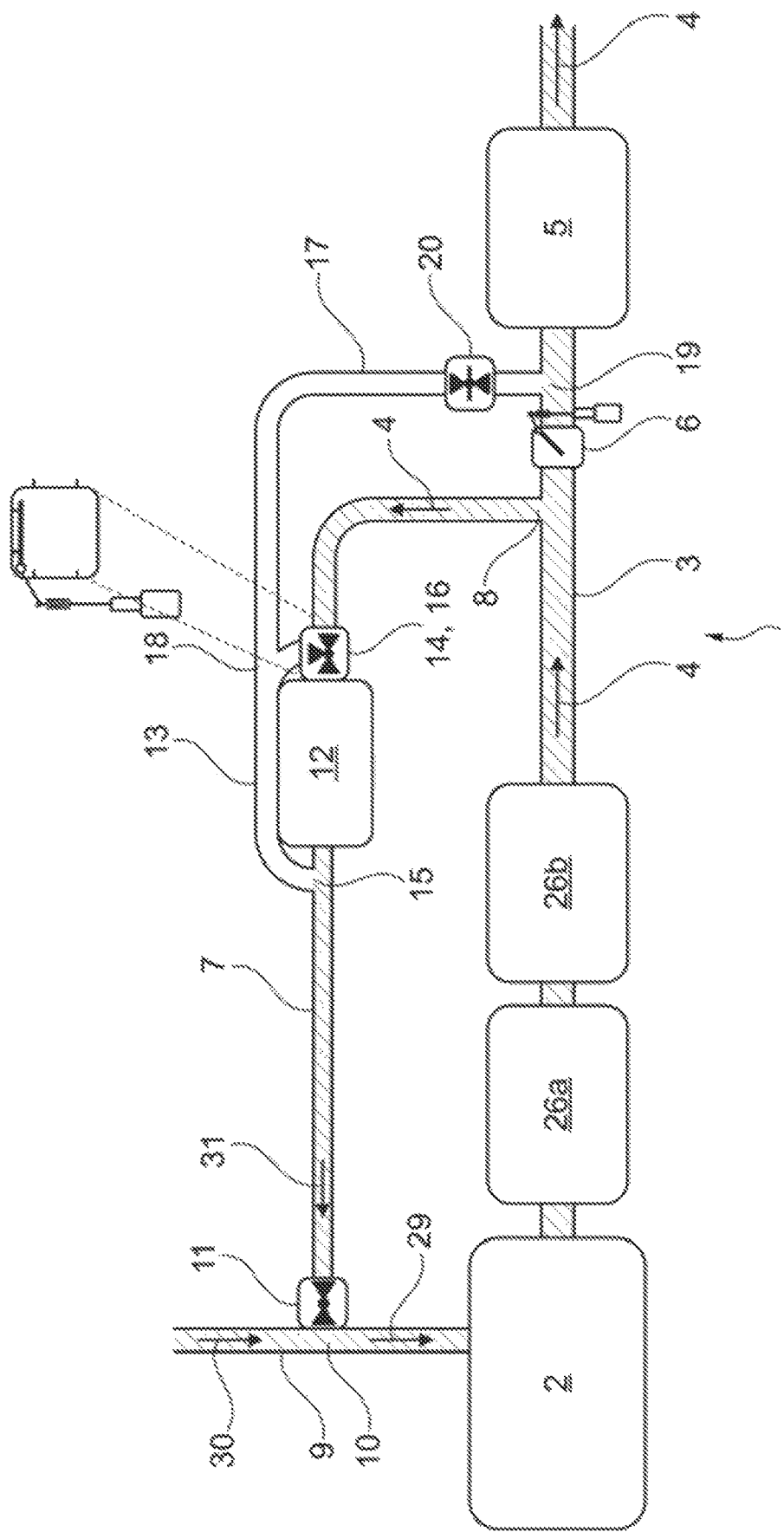
FIG. 3 shows an internal combustion engine with an exemplary exhaust gas system in EGR mode with EGR cooling.
Figure 4:
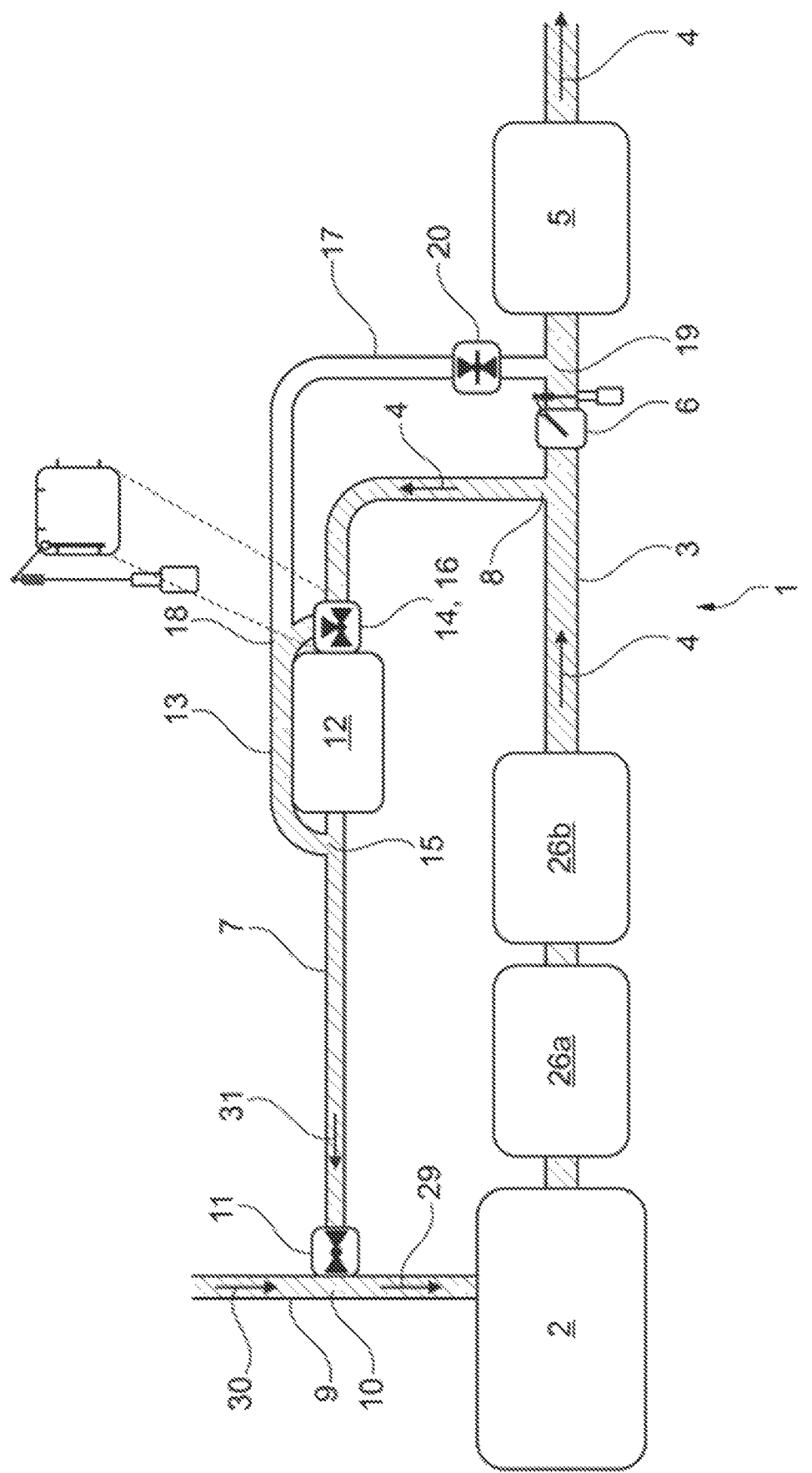
FIG. 4 shows an internal combustion engine with an exemplary exhaust gas system in EGR mode without EGR cooling.
Figure 5:
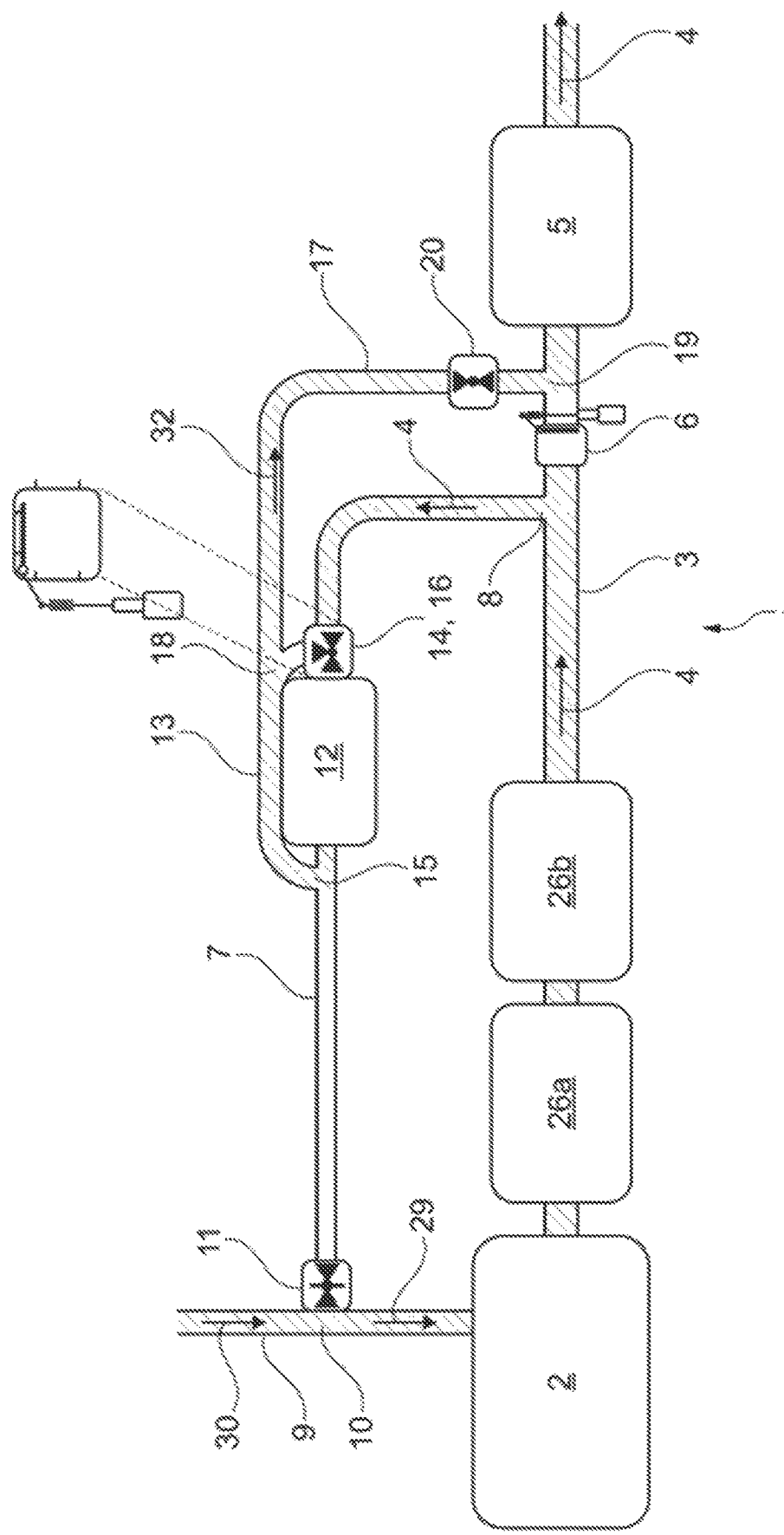
FIG. 5 shows an internal combustion engine with an exemplary exhaust gas system in SCR cooling mode without EGR.
Figure 6:
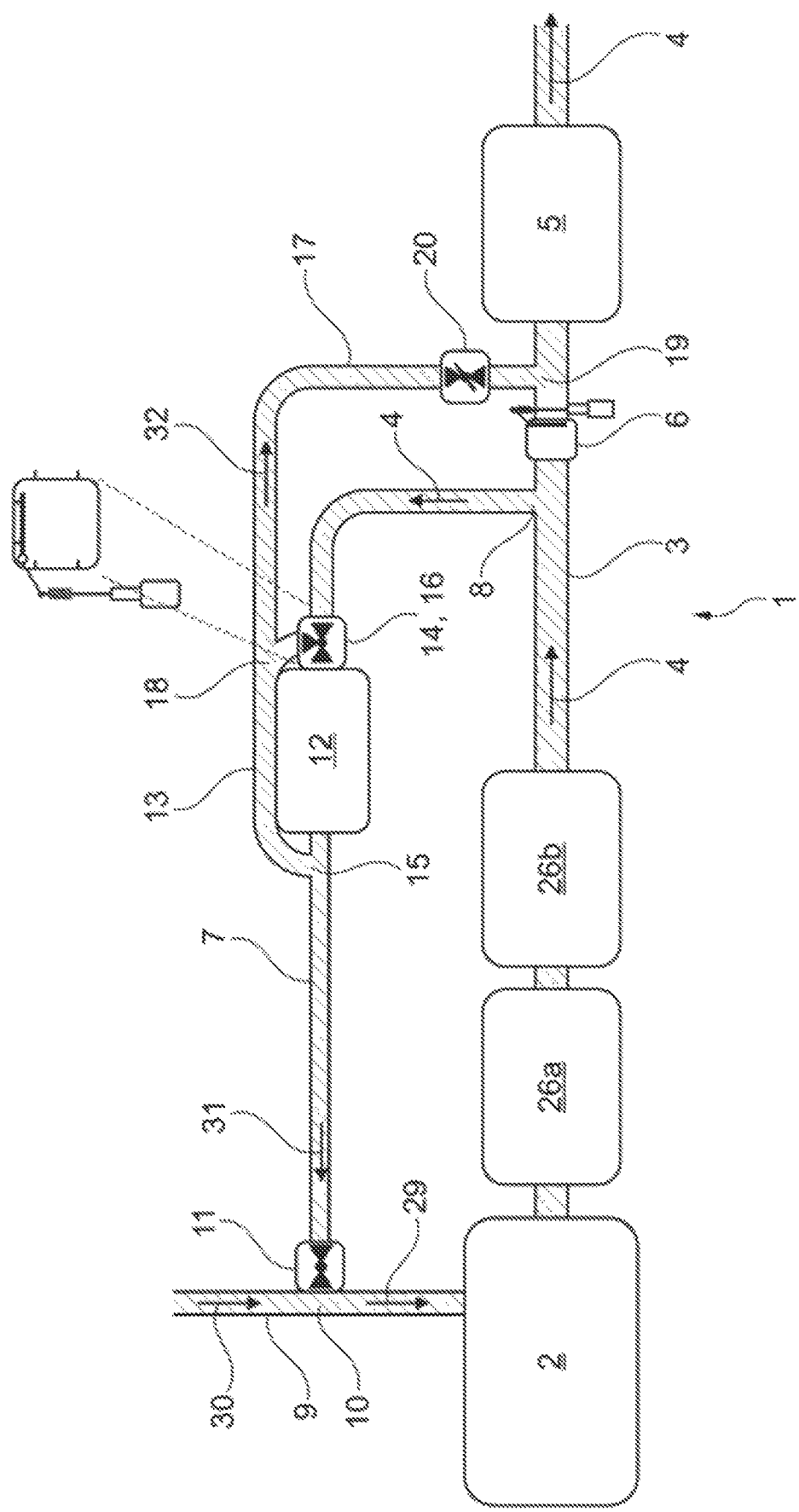
FIG. 6 shows an internal combustion engine with an exemplary exhaust gas system in SCR cooling mode with EGR.
Figure 7:
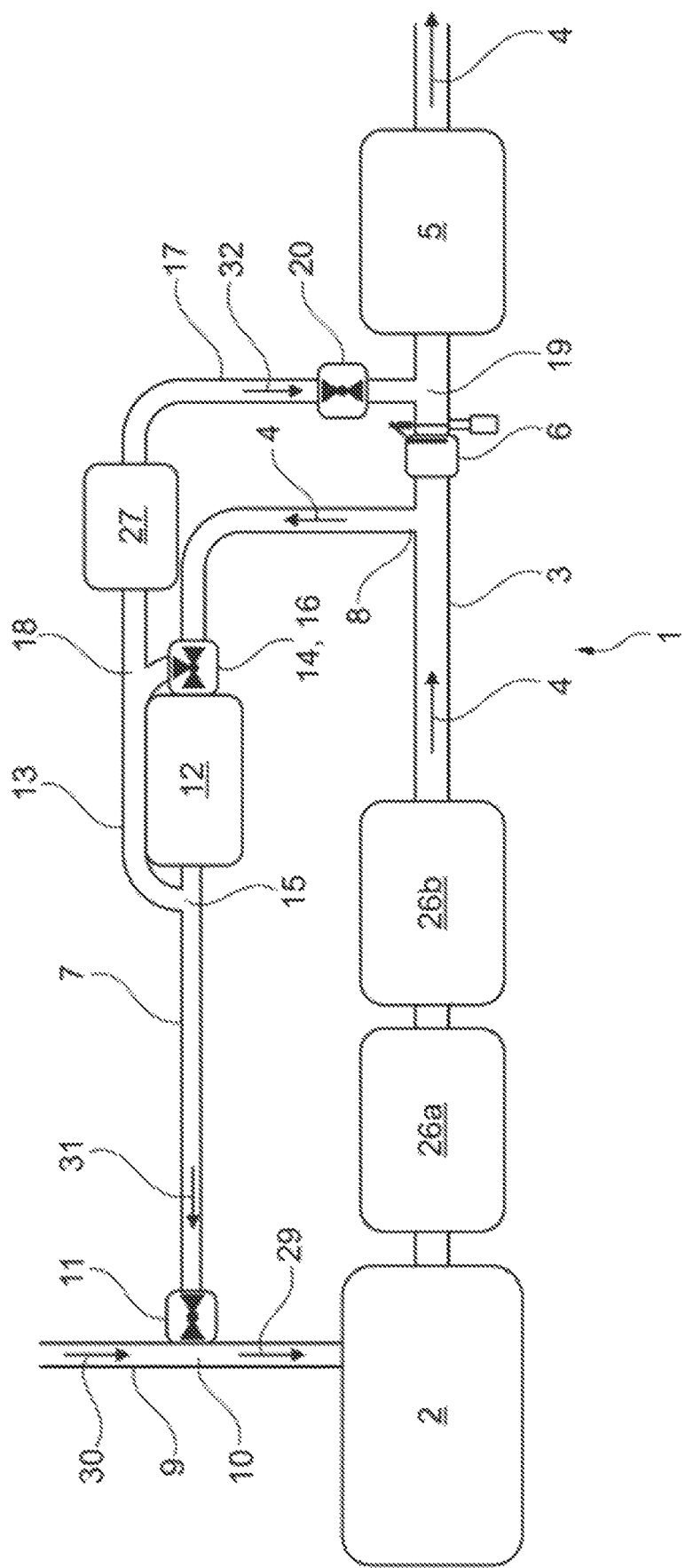
FIG. 7 shows an internal combustion engine with a further exemplary exhaust gas system.
Figure 8:
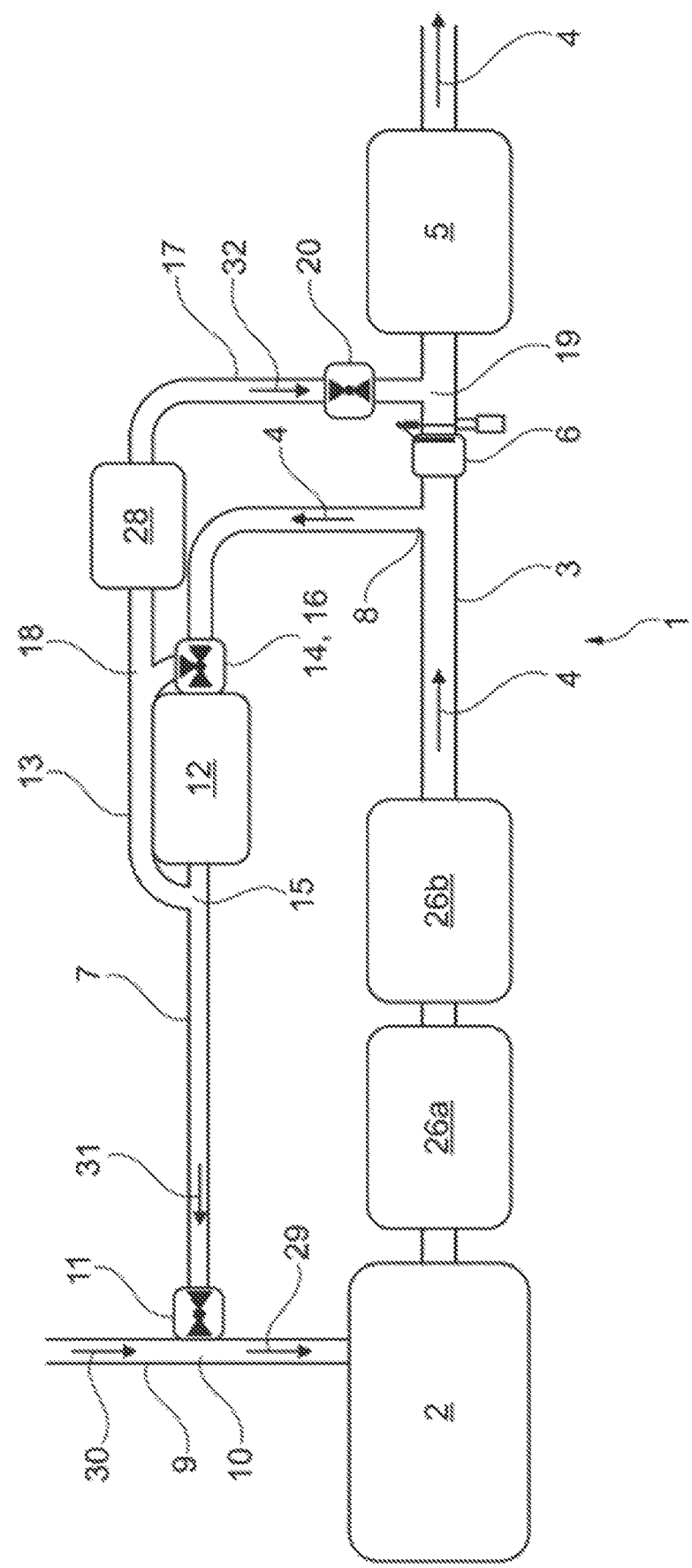
FIG. 8 shows an internal combustion engine with a further exemplary exhaust gas system.
Figure 9:
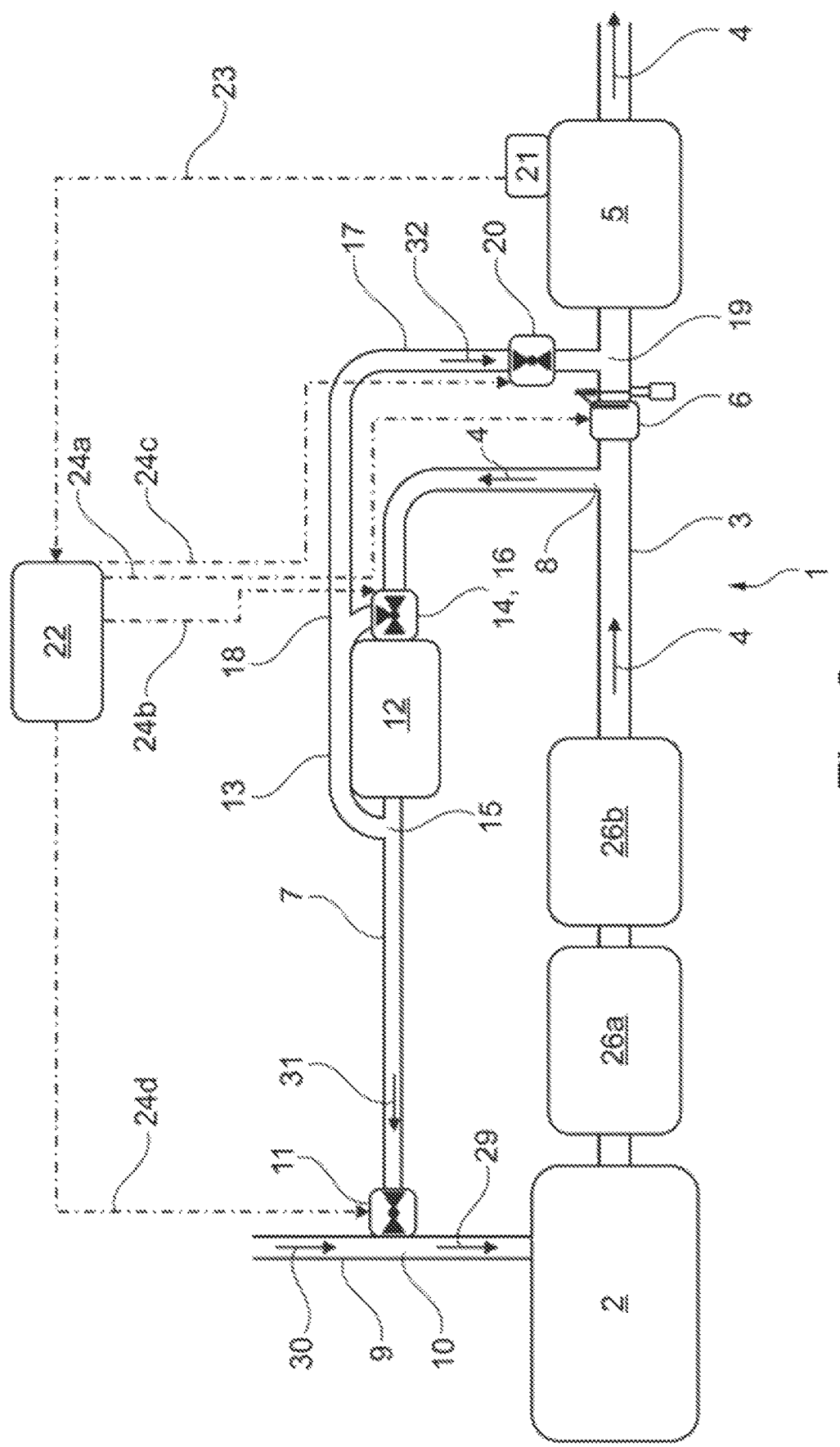
FIG. 9 shows an internal combustion engine with a further exemplary exhaust gas system.
Figure 10:
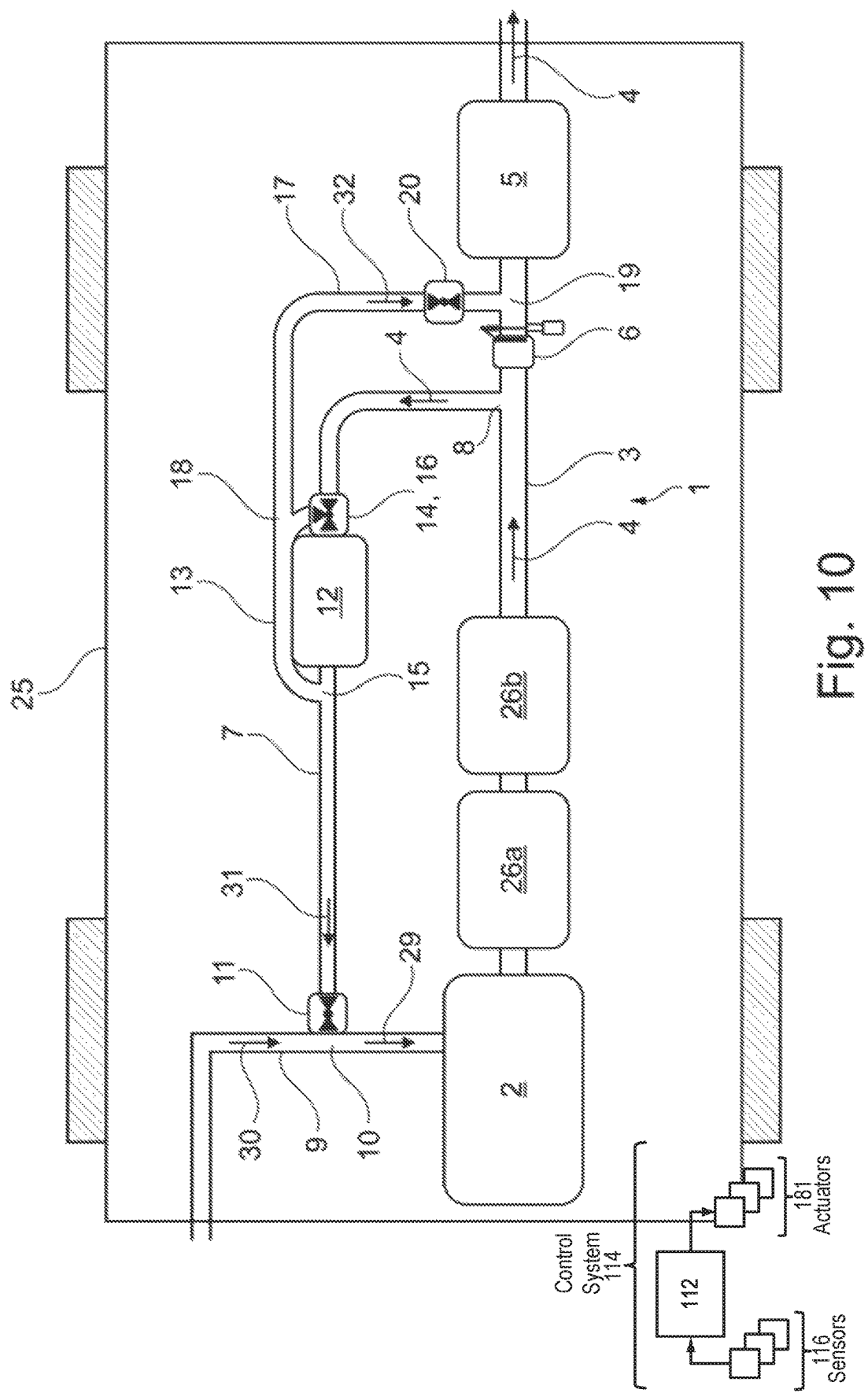
FIG. 10 shows an exemplary motor vehicle comprising an exhaust gas system.
Figure 11A:
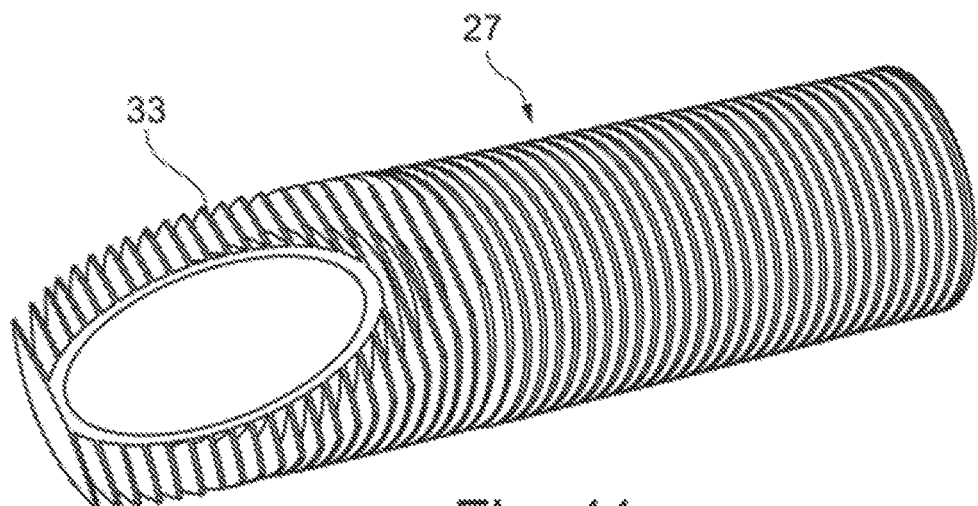
FIG. 11A shows an exemplary heat transmitter.
Figure 11B:
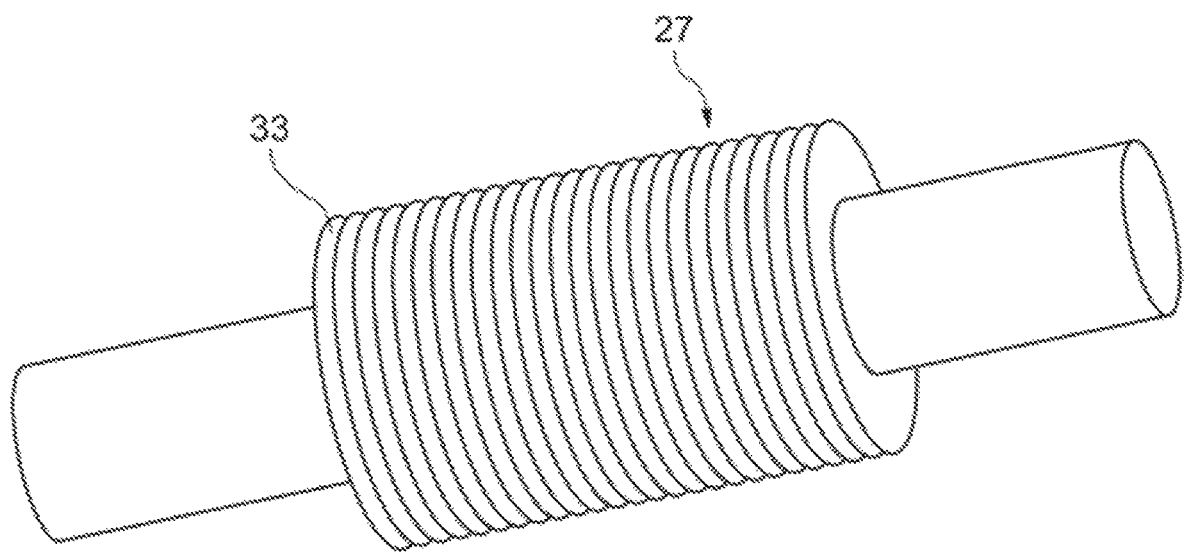
FIG. 11B shows a further exemplary heat transmitter.
Figure 12:
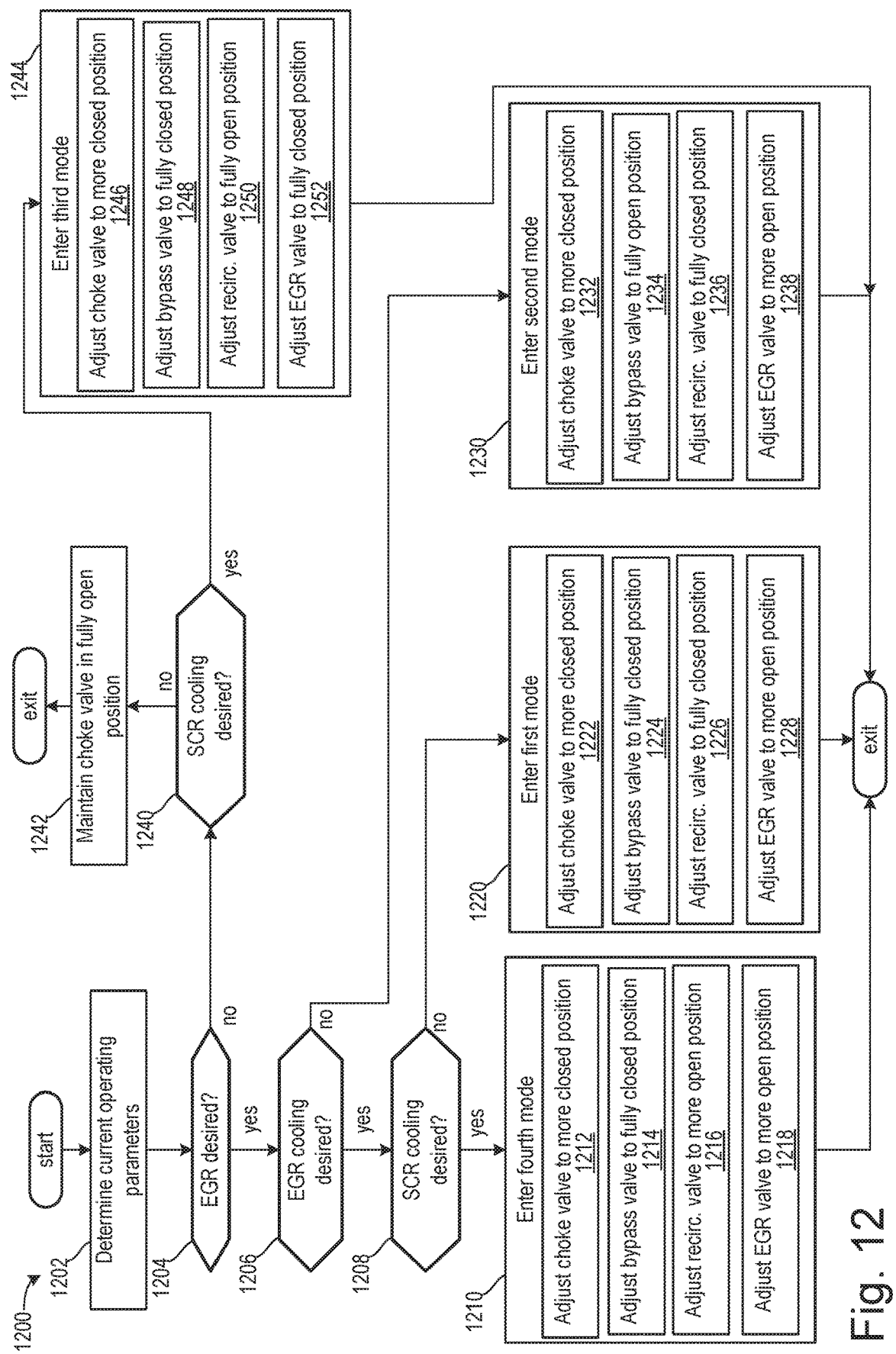
FIG. 12 shows a method for adjusting exhaust gas flow to provide one or more of SCR cooling, EGR, and a combination thereof.

The following description relates to systems and methods for adjusting exhaust gas flow. More specifically, the exhaust gas flow may be adjusted to provide exhaust gas recirculate, cooling to a selective catalytic reduction (SCR) device, or a combination thereof. FIG. 1 shows an internal combustion engine with an exhaust gas system according to the prior art. FIG. 2 shows an internal combustion engine with an exemplary exhaust gas system which illustrates a configuration allowing the system to optionally flow EGR, SCR exhaust cooling gas, or a combination thereof. FIG. 3 shows an internal combustion engine with an exemplary exhaust gas system in EGR mode (e.g., a first mode) with EGR cooling. FIG. 4 shows an internal combustion engine with an exemplary exhaust gas system in EGR mode without EGR cooling (e.g., a second mode). FIG. 5 shows an internal combustion engine with an exemplary exhaust gas system in SCR cooling mode without EGR (e.g., a third mode). FIG. 6 shows an internal combustion engine with an exemplary exhaust gas system in SCR cooling mode with EGR (e.g., a fourth mode). FIG. 7 shows an internal combustion engine with a further exemplary exhaust gas system comprising a heat transmitter. The heat transmitter is illustrated in FIGS. 11A and 11B. FIG. 8 shows an internal combustion engine with a further exemplary exhaust gas system comprising a thermoelectric device. FIG. 9 shows an internal combustion engine with a further exemplary exhaust gas system. FIG. 10 shows an exemplary motor vehicle comprising an exhaust gas system. FIG. 12 illustrates a method for adjusting exhaust gas flow to provide one or more of SCR cooling, EGR, and a combination thereof.

The exhaust gas system is preferably suitable for diesel engines and may accordingly be used in combination with a diesel engine, since diesel engines release comparatively large quantities of nitrogen oxides, relative to spark-ignited engines, which can be effectively converted via an SCR system. However, it will be appreciated that the embodiments described herein may also be applied to spark-ignited engines. Furthermore, the SCR device may be optionally replaced with a different aftertreatment device such as a particulate filter, $NO_x$ trap, three-way catalyst, or other aftertreatment device that may desire enhanced temperature control.

The flow directions specified relate to the flow direction of the exhaust gas from the internal combustion engine towards the exhaust or, in the event of exhaust gas recirculation, back to the internal combustion engine.

Low-pressure exhaust gas recirculation means that exhaust gas is extracted from a recirculation extraction point arranged in the exhaust gas tract downstream of the exhaust gas turbine of a turbocharger and where applicable upstream of exhaust gas aftertreatment devices, and conducted via the exhaust gas recirculation tract to a recirculation introduction point arranged in the intake air tract upstream of the compressor of the turbocharger. The EGR valve arranged at the recirculation introduction point serves to set a mixture ratio between the recirculated exhaust gas and fresh air supplied from the outside into the supply air of the internal combustion engine. When the EGR valve is closed, no exhaust gas recirculation takes place.

The SCR system of the exhaust gas system may be arranged for example in an underfloor region of a motor vehicle. More space is available in this region for arranging the desired components. Also, cooling can take place by heat emission to the surrounding air, and by the wind air stream in the case of a motor vehicle.

The exhaust gas system according to the disclosure allows cooling of the SCR system as desired, in that the exhaust gas introduced into the exhaust gas tract is not supplied directly to the SCR system. Instead, the exhaust gas or part of the exhaust gas is supplied to the cooler and cooled. The cooled exhaust gas is then conducted back as recirculated exhaust gas into the exhaust gas tract upstream of the SCR system via the recirculation line, so that the recirculated exhaust gas reaches the SCR system and reduces its temperature or counters a temperature rise. If exhaust gas recirculation is also desired, the EGR valve may be opened.

The exhaust gas is supplied to the cooler via the LP-EGR tract in that the choke device is fully or partly closed. On partial closure of the choke device, only part of the exhaust gas is supplied to the cooler and cooled, so that at the recirculation introduction point, exhaust gas and recirculated exhaust gas mix and thus a mixture temperature is achieved.

If however no cooling of the SCR system is desired, the recirculation valve is closed and the choke device may be opened further so that the exhaust gas reaches the SCR system on the direct route via the exhaust gas tract.

Optionally, exhaust gas recirculation may also take place here, in that part of the exhaust gas is introduced into the LP-EGR tract and returned to the intake air tract. Depending on demands, the recirculated exhaust gas may be cooled via the cooler, or the cooler may be bypassed using the bypass.

The exhaust gas system allows cooling of the SCR system so that the temperature range desired for adequate nitrogen oxide conversion can be observed and the nitrogen oxide emissions reduced. Advantageously, in addition to an exhaust gas recirculation system normally already present (with LP-EGR tract, EGR valve, cooler, bypass line and bypass valve), only a recirculation line and recirculation valve are demanded, so that less installation space is used relative to the previous example and existing exhaust gas recirculation systems can be upgraded. Also, the exhaust gas system is cheap. In addition, exhaust gas recirculation and SCR system cooling can advantageously be performed simultaneously.

Cooling may be demanded if the temperature of the SCR system exceeds a maximum temperature. In order to establish this, the temperature of the SCR system may be determined, e.g. via a temperature sensor arranged in or on the SCR system or by determination of the exhaust gas temperature downstream of the SCR catalyst, from which the temperature of the SCR system can be estimated.

The temperature of the SCR system may then be compared with the maximum temperature. Cooling may or may not be desired, depending on whether or not the maximum temperature is exceeded.

The need for cooling may be established via a control unit which receives the temperature of the SCR system as an input signal, processes the input signal by comparing the temperature of the SCR system with the maximum temperature, and depending on the result of the comparison, emits a control signal to the choke device, the bypass valve and the recirculation valve in order to open or close these.

The input signal may be processed based on instructions or a code programmed into the control unit according to one or more routines. The control unit may be implemented by hardware and/or software, and be configured physically in one or more pieces. In particular, the control unit may be part of an engine control system or be integrated therein. In a typical embodiment, the engine control system of a motor vehicle acts as the control unit. As well as cooling the SCR system, the control unit may also control the exhaust gas recirculation by emitting a control signal to the EGR valve.

Possible situations in which cooling may be demanded are operation of the internal combustion engine under high load or full load, which leads to a high exhaust gas temperature, or regeneration of a particulate filter arranged upstream of the SCR system, for which high exhaust gas temperatures are used.

In addition, via the recirculation valve, the exhaust gas back pressure may be set and thus a desired EGR rate may be provided. For this, the recirculation valve may preferably be configured as a valve with more than two settings or as a continuously adjustable valve.

According to various embodiments and variants, one or more further exhaust gas aftertreatment devices may be arranged in the exhaust gas tract upstream of the recirculation extraction point and/or downstream of the SCR system. These exhaust gas aftertreatment devices may for example be oxidation catalysts, e.g. a diesel oxidation catalyst, LNT catalysts and/or particulate filters, e.g. a diesel particulate filter or a particulate filter provided with an SCR coating. By the arrangement of further exhaust gas aftertreatment devices, more pollutants may be removed from the exhaust gas. Also, different conditions for the exhaust gas aftertreatment, e.g. different exhaust gas temperatures, may be observed.

According to further embodiment variants, the exhaust gas system may comprise a heat transmitter arranged in the recirculation line. The heat transmitter serves to transmit heat from the exhaust gas to a cooling medium, e.g. air, oil, coolant. The heat transmitter may be integrated in an existing cooling system, e.g. the engine cooling system.

Via the heat transmitter, additional cooling of the exhaust gas flowing in the recirculation line may be achieved, so that the SCR system can be cooled more greatly. Also, the heat transmitter may allow cooling of the SCR system even if cooling of the recirculated exhaust gas via the cooler is not desired and the recirculated exhaust gas flows through the bypass line.

The heat transmitter may have cooling ribs on its surface in order to increase the contact area with the coolant, e.g. the surrounding air, and be able to transmit more heat.

The heat transmitter may be configured for example as an exhaust gas/air heat transmitter in order to transmit heat from the exhaust gas to the surrounding air, and thereby cool the exhaust gas. Preferably, the heat transmitter may be arranged such that the surrounding air flows over the heat transmitter. For this, the heat transmitter may be arranged in the underfloor region of a motor vehicle so that the wind air stream can flow around it.

By forming the heat transmitter as an exhaust gas/air transmitter, advantageously, further loading of the existing cooling system is avoided so that e.g. an overload of the engine cooling system when operating the internal combustion engine at high load can be avoided.

According to further embodiment variants, the exhaust gas system may comprise a thermoelectric device arranged in the recirculation line.

The thermoelectric device serves for converting heat into electrical energy, so that heat can be extracted from the exhaust gas and the exhaust gas may be cooled accordingly when flowing through the thermoelectric devices.

The thermoelectric device may be configured as a so-called thermoelectric generator which can generate a current flow from a temperature difference using the Seebeck effect. A thermoelectric device may have one or more thermoelectric elements which are arranged such that heat from the exhaust gas can be converted into electrical energy. The generated electrical energy may be stored or used directly to supply energy to electrical consumers. Advantageously, therefore, heat from the exhaust gas is not simply emitted to the environment without further use, but is reused after conversion into electrical energy. The energy balance may thereby be improved.

A motor vehicle according to the disclosure comprises an internal combustion engine, an intake air tract and an exhaust gas system as described above. A motor vehicle is a vehicle driven by an engine, e.g. a land-based vehicle, an aircraft or a water craft. Optionally, the motor vehicle may be configured as a hybrid vehicle, e.g. a hybrid electric vehicle.

FIG. 1 shows diagrammatically an internal combustion engine 2 with an exhaust gas system 1 according to the prior art.

An internal combustion engine 2, sometimes known as a combustion machine, is an internal combustion machine for converting chemical energy contained in fuel into mechanical work. The internal combustion engine may for example be self-igniting or externally ignited. The fuel may for example be petrol or diesel.

This intake air 29 used for the combustion process is supplied to the internal combustion engine 2 via an intake air tract 9. During the combustion process, exhaust gas 4 is formed which is conducted into an exhaust gas tract 3 adjoining the internal combustion engine 2. Viewed in the flow direction of the exhaust gas 4, the exhaust gas tract 3 contains several exhaust gas aftertreatment devices 26a, 26b and an SCR system 5, which serve to convert pollutants (e.g. nitrogen oxide, soot particles etc.) contained in the exhaust gas 4. For example, an oxidation catalyst or an LNT catalyst may be provided as an exhaust gas aftertreatment device 26a arranged close to the engine. A particulate filter, which may optionally be provided with a coating for selective catalytic reduction, may be arranged downstream thereof as an exhaust gas aftertreatment device 26b.

The SCR system 5 is remote from the engine, e.g. arranged in the underfloor region of a motor vehicle 25. A choke device 6 is arranged upstream of the SCR system 5, via which the exhaust gas 4 supplied to the SCR system 5 may be choked. The choke device 6 may for example be configured as a choke valve. A pressure difference between the recirculation extraction point 8 and the recirculation introduction point 10, which is necessary for a specific EGR rate, may be set via the choke device 6. FIG. 1 shows the choke device 6 in a closed position merely as an example.

The exhaust gas system 1 contains, as well as the exhaust gas tract 3 and the devices arranged in the exhaust gas tract 3, a low-pressure exhaust gas recirculation tract (LP-EGR tract) 7 which connects a recirculation extraction point 8 arranged in the exhaust gas tract 3 downstream of the choke device 6 with a recirculation introduction point 10 arranged in an intake air tract 9.

An EGR valve 11 is arranged at the recirculation introduction point 10, and sets the quantity of the recirculated exhaust gas 31 which is supplied, together with fresh air 30 from outside, to the internal combustion engine 2 as intake air 29.

A cooler 12 is arranged in the LP-EGR tract 7 and configured to optionally cool the recirculated exhaust gas 31. In order to allow exhaust gas recirculation without cooling, e.g. at cold ambient temperatures or during warm-up of the internal combustion engine 2, a bypass line 13 is provided which connects a bypass extraction point 14 arranged in the LP-EGR tract 7 upstream of the cooler 12 with a bypass introduction point 15 arranged in the LP-EGR tract 7 downstream of the cooler 12, so that the cooler 12 can be bypassed. A bypass valve 16 is arranged at the bypass extraction point 14, via which the ratio of flow to the cooler 12 and flow to the bypass line 13 may be established. The bypass valve 16 may be configured for example as a three-way valve.

With the exhaust gas system 1 shown in FIG. 1, cooling of the SCR system 5 is not possible, but merely the proportion of exhaust gas 4 flowing through the SCR system 5 and that recirculated can be varied. In particular, on operation of the internal combustion engine 2 under high load, there is therefore a risk of overheating of the SCR system 5 so that the selective catalytic reduction no longer proceeds effectively, and there is also a risk of thermal damage to the SCR system 5.

FIG. 2 shows an internal combustion engine 2 with an exemplary exhaust gas system 1 according to the present disclosure. In comparison with the exhaust gas system 1 according to the prior art (FIG. 1), a recirculation line 17 is also provided which connects a recirculation extraction point 18 arranged in the bypass line 13 with a recirculation introduction point 19 arranged in the exhaust gas tract 3 downstream of the choke device 6 and upstream of the SCR system 5. Herein, the recirculation line 17 may be interchangeably referred to as an SCR cooling line.

A recirculation valve 20, which may for example be configured as a 2/2 way directional control valve, is arranged in the recirculation line 17. In FIG. 2, the recirculation valve 20 is shown in an open position merely as an example, so that the recirculated exhaust gas 32 can flow back to the exhaust gas tract 3 via the recirculation line 17.

In FIG. 2, the bypass valve 16 is shown as an example in a half-open position (see enlarged depiction, connected to the bypass valve 16 by dotted lines). In this position, part of the exhaust gas 4 is conducted through the cooler 12 while the remaining exhaust gas 4 flows through the bypass line 13.

The exhaust gas system 1 of FIG. 2 allows cooling of the SCR system 5 in that recirculated exhaust gas 32 is conducted via the recirculation line 17 into the exhaust gas tract 3 upstream of the SCR system 5; it then enters the SCR system 5 and cools this. The actual function of the exhaust gas system 1 is explained in more detail below with reference to FIGS. 3 to 6.

FIG. 3 shows the exhaust gas system 1 of FIG. 2 in EGR mode with EGR cooling. This means that the low-pressure exhaust gas recirculation system is active, i.e. recirculated exhaust gas 31 is conducted into the intake air tract 9, and the recirculated exhaust gas 31 is cooled.

The exhaust gas 4 formed in the internal combustion engine 2 firstly flows through the exhaust gas aftertreatment devices 26*a*, 26*b*. Then the exhaust gas 4 is divided into two partial streams at the recirculation extraction point 8, wherein the ratio of the two partial streams is set by means of the choke device 6, which in FIG. 3 is shown in a half-open position. A first partial stream of exhaust gas 4 flows through the choke device 6, then enters the SCR system 5 and is emitted to the environment after passing through the SCR system 5.

The second partial stream of exhaust gas 4 enters the LP-EGR tract 7. Since the bypass valve 16 is in a closed position, the stream flows through the cooler 12 but not through the bypass line 13. After passing through the cooler, the cooled recirculated exhaust gas 31 flows into the intake air tract 9, wherein the quantity of recirculated exhaust gas 31 is set via the EGR valve 11. The recirculated exhaust gas 31 combines with fresh air 30 supplied from the outside at the recirculation introduction point 10. The resulting intake air 29 is supplied to the internal combustion engine 2.

The recirculation valve 20 is closed so that no recirculated exhaust gas 32 can enter the exhaust gas tract 3 via the recirculation line 17.

The operating mode shown in FIG. 3 corresponds to an operating mode in which no cooling of the SCR system 5 is demanded, but exhaust gas recirculation is desired. The embodiment of FIG. 3 may be optionally referred to as a first mode. Then the recirculated exhaust gas 31 can preferably be cooled in the case of high exhaust gas temperatures, e.g. after the internal combustion engine 2 has reached its desired operating temperature. Such an operating mode may be selected for example when the internal combustion engine 2 is operated at low load.

FIG. 4 shows the exhaust gas system 1 of FIG. 2 in EGR mode without EGR cooling. This results in the low-pressure exhaust gas recirculation system being active where recirculated exhaust gas 31 is introduced into the intake air tract 9, but the recirculated exhaust gas 31 is not cooled.

In contrast to the operating mode with EGR cooling shown in FIG. 3, the bypass valve 16 is in an open position. Accordingly, the exhaust gas 4 does not flow through the cooler 12 but instead through the bypass line 13. The recirculated exhaust gas 31 is thus introduced into the intake air tract 9 without cooling.

The operating mode depicted in FIG. 4 corresponds to an operating mode in which no cooling of the SCR system 5 is desired, but exhaust gas recirculation is desired. Herein, the operation illustrated in the example of FIG. 4 may be optionally referred to as a second mode Cooling of the recirculated exhaust gas 31 may be omitted for example as long as the internal combustion engine 2 has not yet reached its normal operating temperature, and accordingly the exhaust gas temperature is low. Such an operating mode may be selected for example when the internal combustion engine 2 is operated under low load in a warm-up phase. In this way, the second mode differs from the first mode in that EGR in the second mode is not cooled via the cooler 12 while in the first mode, the EGR is cooled.

FIG. 5 shows the exhaust gas system 1 from FIG. 2 in an SCR cooling mode without EGR. Herein, the operation illustrated in the example of FIG. 5 may be optionally described as a third mode. The third mode results in the low-pressure exhaust gas recirculation system not being active resulting in no recirculated exhaust gas 31 flowing to the intake air tract 9. However, recirculated exhaust gas 32 is supplied to the exhaust gas tract 3 so that the SCR system 5 may be cooled.

As already described with reference to FIG. 3, the exhaust gas formed in the internal combustion engine 2 firstly flows through the exhaust gas aftertreatment devices 26*a*, 26*b*. In contrast to the operating mode in FIG. 3, the choke device 6 is however in a closed position, so that all the exhaust gas 4 is conducted into the LP-EGR tract 7.

As in FIG. 3, the bypass valve 16 is in a closed position so that the exhaust gas 4 flows through the cooler 12 and is cooled. Since the EGR valve 11 is in the closed position, no recirculated exhaust gas 31 reaches the intake air tract 9. Instead, the cooled exhaust gas 4 flows into the bypass line 13 and from there into the recirculation line 17 via the recirculation extraction point 18. Via the recirculation valve 20 in an open position, the recirculated exhaust gas 32 is returned to the exhaust gas tract 3 and then reaches the SCR system 5. Since, because of cooling via the cooler 12, the recirculated exhaust gas 32 has a lower temperature than the exhaust gas 4 at the recirculation extraction point, the SCR system 5 is cooled or a lower temperature of the SCR system 5 can be maintained.

The operating mode shown in FIG. 5 may be selected for example when the internal combustion engine 2 is operated under full load and the SCR system 5 therefore demands cooling.

FIG. 6 shows the exhaust gas system 1 of FIG. 2 in an SCR cooling mode with EGR flowing. The operation illustrated in FIG. 6 may be herein optionally referred to as a fourth mode. This results in the low-pressure exhaust gas recirculation system being active, which includes recirculated exhaust gas 31 being conducted into the intake air tract 9. In addition, recirculated exhaust gas 32 is supplied to the exhaust gas tract 3 so that the SCR system 5 may be cooled.

In contrast to the third mode illustrated in FIG. 5, the EGR valve 11 is in an open position so that recirculated exhaust gas is conducted into the intake air tract 9. The recirculation valve 20 may be in a fully open position as shown in FIG. 5, or be partly opened as shown in FIG. 6. Via the opening position of the recirculation valve 20, a desired exhaust gas back pressure may be set so that a desired EGR rate can be achieved. For this, the recirculation valve 20 is configured not as a 2/2-way directional control valve but as a continuously adjustable valve.

The fourth mode shown in FIG. 6 may be selected for example when the internal combustion engine 2 is operated under full load and the SCR system 5 therefore demands cooling, and in addition exhaust gas recirculation is desired to decrease $NO_x$ and/or engine combustion temperatures.

Thus, in one example, the embodiments of FIGS. 2-6 illustrate an exhaust gas system comprising an exhaust throttle valve (e.g., choke valve 6) arranged in an exhaust gas passage directly downstream of a junction at which a low-pressure exhaust-gas recirculation (LP-EGR) passage is fluidly coupled to the exhaust gas passage. The exhaust throttle valve is configured to adjust an amount of exhaust gas leaving the exhaust gas passage and entering the LP-EGR passage. In one example, if the exhaust throttle valve is more open, then less exhaust gas enters the LP-EGR passage. Thus, if the exhaust throttle valve is more closed, then more exhaust gas enters the LP-EGR passage.

The LP-EGR passage comprises a cooler configured to cool exhaust gas. A bypass comprising a bypass valve may be configured to flow exhaust gas around the cooler when LP-EGR cooling is not desired. The LP-EGR passage may be fluidly coupled to an intake passage, wherein an EGR valve is arranged upstream of an intersection between the LP-EGR passage and the intake passage relative to a direction of exhaust gas flow.

The exhaust gas system further comprises an aftertreatment cooling line (e.g., recirculation line 17) which is configured to divert a portion of the LP-EGR from the LP-EGR passage to an aftertreatment device arranged in the exhaust gas passage, wherein the aftertreatment device is downstream of the exhaust throttle valve. Exhaust gas flow through the aftertreatment cooling line may be adjusted via a recirculation valve. Thus, when the choke valve is open, a combination of the EGR valve and the recirculation valve may be adjusted to adjust exhaust gas flow to the intake passage and to the aftertreatment device, respectively.

FIG. 7 shows an internal combustion engine 2 with a further exemplary embodiment of an exhaust gas system 1. In comparison with the embodiment in FIG. 2, a heat transmitter 27—which may for example be configured as an air/air heat transmitter—is also arranged in the recirculation line 17. FIGS. 11a and 11b show exemplary embodiment variants for the heat transmitter 27 with cooling ribs 33.

The recirculated exhaust gas 32 may be further cooled via the heat transmitter 27, so that as a result, the SCR system 5 may be cooled more greatly. This may be the case if there is a particularly high demand for cooling of the SCR system 5. As such, in the example of FIG. 7, SCR cooling exhaust gas (e.g., recirculated exhaust gas 32) returning to the SCR system 5 may be cooler than cooled recirculated exhaust gas 31 via the second cooling provided by the heat transmitter 27.

In some examples of the exhaust gas system where the heat transmitter 27 is arranged, exhaust gas without cooling may be directed to the intake passage while cooled exhaust gas may still flow to the SCR system 5.

FIG. 8 shows an internal combustion engine 2 with a further exemplary embodiment of an exhaust gas system 1. In contrast to the embodiment in FIG. 2, in addition a thermoelectric device 28 is arranged in the recirculation line 17. Via the thermoelectric device, heat may be extracted from the recirculated exhaust gas 32 and converted into electrical energy.

The recirculated exhaust gas 32 may be further cooled via the thermoelectric device 28, so that as a result, the SCR system 5 may be cooled more greatly. This may be the case if there is a particularly high need for cooling of the SCR system 5. Optionally, both a thermoelectric device 28 and a heat transmitter 27 may be arranged in the recirculation line 17.

FIG. 9 shows an internal combustion engine 2 with a further exemplary embodiment of an exhaust gas system 1. In comparison with the embodiment in FIG. 2, the exhaust gas system 1 also comprises a temperature determination device 21 and a control unit 22. The temperature determination device 21 may be configured as a temperature sensor and arranged on the SCR system 5, as shown in FIG. 9. The temperature determination device 21 serves for determining the temperature of the SCR system 5.

The temperature determination device 21 is connected to the control unit 22 for signal transmission, so that an input signal 23 (representing for example the temperature of the SCR system 5) is transmitted to the control unit 22 and can be received thereby.

The control unit processes the input signal 23, wherein the temperature of the SCR system 5 is compared with a maximum temperature. It is thus established whether the maximum temperature is exceeded and whether there is a need for cooling the SCR system 5. Depending on the comparison result, control signals 24a, 24b, 24c are sent to the choke device 6, the bypass valve 16 and the recirculation valve 20, each of which is connected to the control unit 22 for signal transmission. For example, if there is a cooling need, the recirculation valve 20 is opened and the choke device 6 at least partially closed.

Also, the control unit 22 is connected to the EGR valve 11 for signal transmission, so that a control signal 24d can be sent to the EGR valve 11 for optionally opening or closing the EGR valve 11.

The operating modes shown in FIGS. 3 to 6 may be implemented for example via the control unit 22, in that the choke device 6, the bypass valve 16, the recirculation valve 20 and the EGR valve 11 may be actuated accordingly. That is to say, the control unit 22 may comprise instructions stored on non-transitory memory thereof that when executed enable the control unit 22 to adjust positions of the choke device 6, the bypass valve 16, the recirculation valve 20, and the EGR valve 11 based on feedback from at least the temperature determination device 21.

FIG. 10 shows an exemplary motor vehicle 25 which comprises an internal combustion engine 2, an intake air tract 9 and an exhaust gas system 1. The exhaust gas system 1 shown in FIG. 10 is identical in configuration to the exhaust gas system 1 of FIG. 2. Evidently, further exhaust gas systems 1 described, or a combination thereof, may also be integrated in the motor vehicle 25. For example, the exhaust systems of FIGS. 7, 8, and 9 may be used with the motor vehicle 25.

The motor vehicle 25 further comprises a control system 114. Control system 114 is shown receiving information from a plurality of sensors 116 (various examples of which are described above) and sending control signals to a plurality of actuators 181 (various examples of which are described herein). As one example, sensors 116 may include temperature determination sensor 11 of FIG. 9 located at an emission control device, such as SCR device 5. Actuators 181 may include the choke device 6, the bypass valve 16, the recirculation valve 20, and the EGR valve 11.

Controller 112 may be configured as a conventional microcomputer including a microprocessor unit, input/output ports, read-only memory, random access memory, keep alive memory, a controller area network (CAN) bus, etc. Controller 112 may be a non-limiting example of the control unit 22 of FIG. 10. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Although the disclosure has been illustrated and described in detail via preferred exemplary embodiments, the disclosure is not restricted by the examples disclosed and other variations may be derived therefrom by the person skilled in the art without leaving the scope of protection of the disclosure.

FIGS. 2-11B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 12, it shows a method 1200 for selecting one of the first, second, third, and/or fourth modes. Instructions for carrying out method 1200 and the rest of the methods included herein may be executed by a controller based on instructions stored on a memory of the controller and in conjunction with signals received from sensors of the engine system, such as the sensors described above with reference to FIGS. 9 and 10. The controller may employ engine actuators of the engine system to adjust engine operation, according to the methods described below.

The method 1200 begins at 1202, which includes determining, estimating, and/or measuring one or more current operating parameters. The current operating parameters may include one or more of but are not limited to a manifold vacuum, an intake throttle position, an engine temperature, an engine speed, a vehicle speed, an SCR device temperature, and an air/fuel ratio.

The method 1200 proceeds to 1204, which includes determining if EGR is desired. EGR may be desired to meet emissions standards and/or to decrease combustion temperatures. That is to say, EGR may be desired to decrease a $NO_x$ output or to decrease engine temperatures.

If EGR is desired, then the method 1200 proceeds to 1206, which includes determining if EGR cooling is desired. EGR cooling may be desired if engine temperatures are relatively high and further cooling is desired.

If EGR cooling is desired, then the method 1200 proceeds to 1208, which includes determining if SCR cooling is desired. SCR cooling may be desired if an SCR temperature is above an upper threshold temperature, wherein the upper threshold temperature may correspond to a temperature at which the SCR device may degrade.

If SCR cooling is desired, then the method 1200 proceeds to 1210 to enter the fourth mode, which includes adjusting a choke valve to a more closed position at 1212, adjust a bypass valve to a fully closed position at 1214, adjust a recirculation valve to a more open position at 1216, and adjust an EGR valve to a more open position at 1218. The choke valve is moved to a more closed position, which results in more exhaust gas flowing to an exhaust gas recirculation passage and less flowing directly to the SCR device. By adjusting the bypass valve to the fully closed position, the recirculated exhaust gas is forced to flow to the cooler. As such, the exhaust gas is cooled. The recirculation valve (e.g., recirculation valve 20 and/or SCR cooling valve 20 of FIGS. 3 through 6) is adjusted to a more open position between a fully open position and a fully closed position, which allows exhaust gas to flow to the intake passage and back to the exhaust passage toward the SCR device. The EGR valve is adjusted to a more open position which allows cooled EGR to flow to an intake tract. In this way, the fourth mode may correspond to a more where cooled EGR is flowed to the intake tract and cooler exhaust gas is flowed to the SCR device which may decrease a temperature of the SCR device.

In some examples, if EGR cooling is not desired, but SCR cooling is desired and EGR is desired, then a fifth mode may include where the bypass valve is moved to a fully open position to flow exhaust gas around the cooler and to the intact tract and the SCR cooling passage (e.g., the recirculation passage). Exhaust gas flow back to the SCR may be cooled via a second cooling device configured to cool only exhaust gases flowing back to the SCR.

As described above, the valves may be moved to the fully open position, the fully closed position, and to positions therebetween. The fully open position may correspond to a position where a maximum amount of gas is allowed to flow through the valve. The fully closed position may correspond to a position where a minimum amount of gas is allowed to flow through the valve. In one example, the minimum amount of gas is zero. Thus, the positions between the fully open position and the fully closed position may correspond to more open and more closed positions, wherein a more open position more closely resembles the fully open position and a more closed position more closely resembles the fully closed position.

Returning to 1208, if SCR cooling is not desired, for example due to the SCR temperature being less than the upper threshold temperature, then the method 1200 proceeds to 1220 which includes entering a first mode. The first mode includes adjusting the choke valve to the more closed position at 1222, adjusting the bypass valve to the fully closed position at 1224, adjusting the recirculation valve to the fully closed position at 1226, and adjusting the EGR valve to a more open position at 1228. As such, EGR may be cooled and directed to the intake passage without flowing to the SCR device.

Returning to 1206, if EGR cooling is not desired, then the method 1200 proceeds to 1230, which includes entering the second mode. The second mode comprises adjusting the choke valve to a more closed position at 1232, adjusting the bypass valve to the fully open position at 1234, adjusting the recirculation valve to the fully closed position at 1236, and adjusting the EGR valve to a more open position at 1238. As such, EGR flows to the intake passage without flowing through the cooler.

Returning to 1204, if EGR is not desired, then the method 1200 proceeds to 1240 to determine if SCR cooling is desired. If SCR cooling is not desired, then the method 1200 proceeds to 1242, which includes maintaining the choke valve in the fully open position. As such, EGR may not flow and exhaust gas may flow directly to the SCR device without being cooled.

If SCR cooling is desired, then the method 1200 proceeds to 1244, which includes entering the third mode. The third mode comprises adjusting the choke valve to a more closed position at 1246, adjusting the bypass valve to the fully closed position at 1248, adjusting the recirculation valve to a fully open position at 1250, and adjusting the EGR valve to the fully closed position at 1252. As such, exhaust gas recirculate is blocked from flow to the intake tract while allowed cooled exhaust gas to flow through the recirculation passage and to the SCR device.

In this way, an exhaust gas system comprises a recirculation passage configured to divert a portion of cooled exhaust gas to an SCR device. The exhaust gas system may comprise a plurality of valves for adjusting exhaust gas flow from the exhaust passage to an SCR device. The technical effect of configuring an exhaust system to flow cooled exhaust gas to the SCR device is to decrease degradation of the SCR device via enhanced temperature control of the SCR device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas system for an internal combustion engine, comprising:
    an exhaust gas tract configured to receive an exhaust gas produced by an internal combustion engine;
    an SCR system arranged in the exhaust gas tract;
    a choke device arranged in the exhaust gas tract upstream of the SCR system;
    a low-pressure exhaust gas recirculation tract fluidly coupled to a recirculation extraction point arranged in the exhaust gas tract upstream of the choke device with a recirculation introduction point arranged in an intake air tract;
    an EGR valve arranged at the recirculation introduction point;
    a cooler arranged in the low-pressure exhaust gas recirculation tract;
    a bypass line which connects a bypass extraction point arranged in the low-pressure exhaust gas recirculation tract upstream of the cooler with a bypass introduction point arranged in the low-pressure exhaust gas recirculation tract downstream of the cooler;
    a bypass valve arranged at the bypass extraction point;
    a recirculation line which connects a recirculation extraction point arranged in the bypass line with a recirculation introduction point arranged in the exhaust gas tract downstream of the choke device and upstream of the SCR system, and
    a recirculation valve arranged in the recirculation line.

2. The exhaust gas system of claim 1, wherein a temperature determination device configured to determine the temperature of the SCR system.

3. The exhaust gas system of claim 2, wherein a control unit is configured to receive and process an input signal from the temperature determination device and to output control signals to each of the choke device, the bypass valve, and the recirculation valve to adjust a position thereof.

4. The exhaust gas system of claim 1, wherein the SCR system is arranged in an underfloor region of a motor vehicle.

5. The exhaust gas system of claim 1, further comprising exhaust gas aftertreatment devices are arranged in the exhaust gas tract upstream of the recirculation extraction point or downstream of the SCR system.

6. The exhaust gas system of claim 5, wherein the exhaust gas aftertreatment devices are selected from a group comprising oxidation catalysts, LNT catalysts, and particulate filters.

7. The exhaust gas system of claim 1, wherein a heat transmitter is arranged in the recirculation line.

8. The exhaust gas system according to claim 7, wherein the heat transmitter is configured as an exhaust gas/air heat transmitter.

9. The exhaust gas system of claim 1, wherein a thermoelectric device is arranged in the recirculation line.

10. The exhaust gas system of claim 1, wherein the exhaust gas system is arranged on a motor vehicle comprising an internal combustion engine and an intake air tract.

11. A system, comprising:
an exhaust passage fluidly coupled to an exhaust gas recirculation passage, wherein a cooler is arranged in the exhaust gas recirculation passage, further comprising an aftertreatment cooling passage fluidly coupled to the exhaust gas recirculation passage at an intersection downstream of the cooler and to the exhaust passage at an intersection upstream of an aftertreatment device.

12. The system of claim 11, wherein the aftertreatment device is a selective catalytic reduction device.

13. The system of claim 11, wherein a choke valve is arranged in the exhaust passage upstream of the aftertreatment device and downstream of a junction where the exhaust gas recirculation passage is fluidly coupled to the exhaust passage.

14. The system of claim 11, wherein an exhaust gas recirculation valve is arranged in the exhaust gas recirculation passage downstream of the cooler and directly upstream of an intake passage.

15. The system of claim 11, wherein an aftertreatment cooling valve is arranged in the aftertreatment cooling passage and configured to adjust an amount of exhaust gas returning to the exhaust passage from the aftertreatment cooling passage.

16. A method, comprising:
selecting a first mode in response to cooled exhaust-gas recirculate being desired by adjusting a choke valve to a more closed position, a bypass valve to a fully closed position, a recirculation valve to the fully closed position, and an exhaust-gas recirculation valve to a more open position;

selecting a second mode in response to exhaust-gas recirculate without cooling being desired by adjusting the choke valve to the more closed position, the bypass valve to a fully open position, the recirculation valve to the fully closed position, and the exhaust-gas recirculation valve to the more open position;

selecting a third mode in response to SCR cooling being desired without exhaust-gas recirculate by adjusting the choke valve to the more closed position, the bypass valve to the fully closed position, the recirculation valve to the fully open position, and the exhaust-gas recirculation valve to the fully closed position; and selecting a fourth mode in response to SCR cooling being desired and exhaust-gas recirculate with cooling being desired by adjusting the choke valve to the more closed position, the bypass valve to the fully closed position, the recirculation valve to the more open position, and the exhaust-gas recirculation valve to the more open position.

17. The method of claim 16, further comprising flowing exhaust gas from an exhaust passage to an exhaust-gas recirculation passage and through a cooler to an intake passage without flowing exhaust gas through a recirculation passage to a selective catalytic reduction device arranged in the exhaust passage during the first mode.

18. The method of claim 17, further comprising flowing exhaust gas from the exhaust passage to the exhaust-gas recirculation passage and around the cooler to the intake passage without flowing exhaust gas through the recirculation passage to the selective catalytic reduction device arranged in the exhaust passage during the second mode.

19. The method of claim 17, further comprising flowing exhaust gas from an exhaust passage to an exhaust-gas recirculation passage and through the cooler to the recirculation passage without flowing exhaust-gas recirculate to the intake passage during the third mode.

20. The method of claim 17, further comprising flowing exhaust gas from the exhaust passage to the exhaust-gas recirculation passage and through the cooler to the intake passage and to the recirculation passage to the selective catalytic reduction device arranged in the exhaust passage during the fourth mode.

* * * * *